(No Model.)
J. H. BLUM.
STEADY REST.
No. 562,271. Patented June 16, 1896.
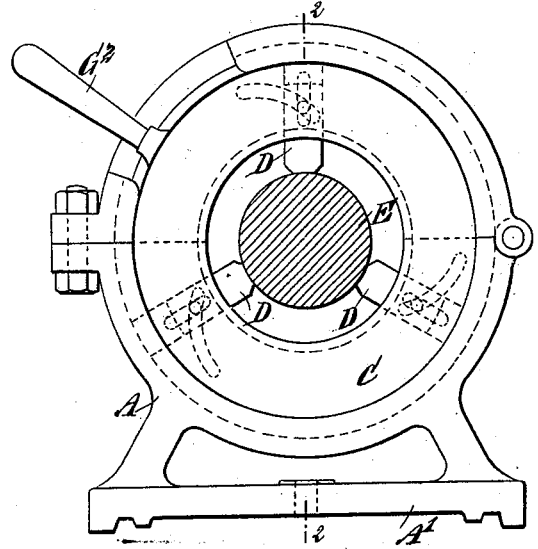
Fig. 1
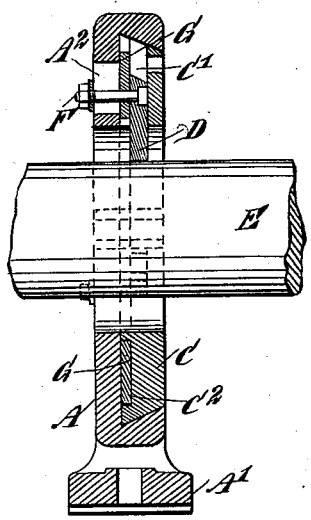
Fig. 2
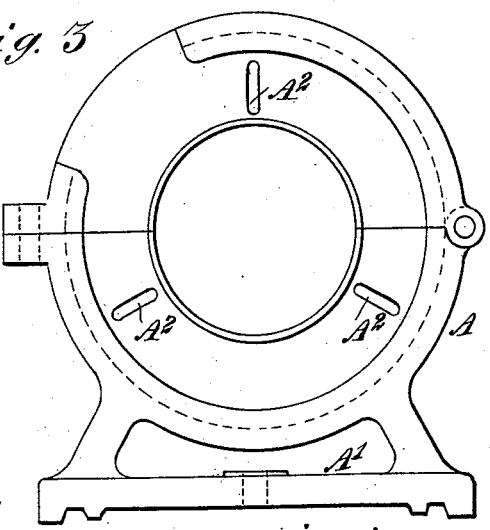
Fig. 3
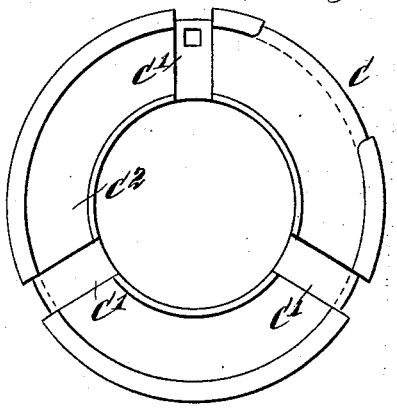
Fig. 4
Fig. 5
Fig. 6  Fig. 7
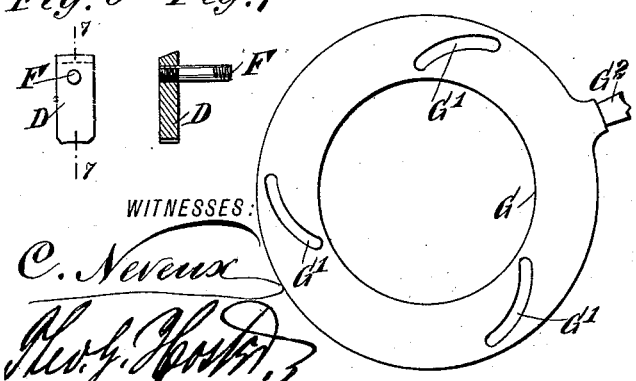
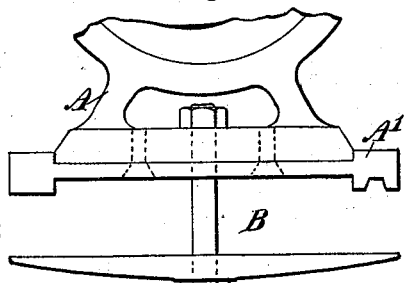
Fig. 8
WITNESSES:
C. Neveux
Geo. J. Foster
INVENTOR
J. H. Blum.
BY
Munn & Co
ATTORNEYS.

UNITED STATES PATENT OFFICE.

JOHN H. BLUM, OF BUTTE, MONTANA.

STEADY-REST.

SPECIFICATION forming part of Letters Patent No. 562,271, dated June 16, 1896.

Application filed October 22, 1895. Serial No. 566,464. (No model.)

*To all whom it may concern:*

Be it known that I, JOHN H. BLUM, of Butte, in the county of Silver Bow and State of Montana, have invented a new and Improved Steady-Rest, of which the following is a full, clear, and exact description.

The invention relates to engine-lathes; and its object is to provide a new and improved steady-rest which is simple and durable in construction, and arranged to greatly facilitate the lining up of the work in the lathe.

The invention consists principally of a stand formed with a circular bearing, and a manually-operated ring mounted in said stand and forming a bearing for the said ring.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a face view of the improvement. Fig. 2 is a transverse section of the same on the line 2 2 of Fig. 1. Fig. 3 is a face view of the stand. Fig. 4 is a face view of the jaw-carrier. Fig. 5 is a face view of the ring. Fig. 6 is a face view of one of the jaws. Fig. 7 is a transverse section of the same on the line 7 7 of Fig. 6, and Fig. 8 is a face view of a clamp for fastening the stand in place on the lathe-bed.

The steady-rest is provided with a stand A, having a base A', fitted to slide longitudinally on the bed of the lathe, and adapted to be secured thereon by a suitable clamp B, as shown in Fig. 8. The stand A is preferably made in two parts hinged together and fastened by a bolt at the free ends, as plainly illustrated in Fig. 1, so that the stand may be opened for the convenient insertion of a jaw-carrier C, made in the form of a ring and with its outer end beveled to fit in a corresponding groove in the stand A, as will be readily understood by reference to the drawings.

In the jaw-carrier C are formed a number of radially-arranged grooves C', in which are fitted to slide jaws D, adapted to engage with their inner ends the work E, passed through the openings in the jaw-carrier C and stand A, it being understood that said openings are considerably larger in diameter than the diameter of the work E.

Each of the jaws D carries a bolt F, extending at right angles to the jaw and passing through a cam-slot G', formed in a ring G, mounted to turn in a circular recess $C^2$, formed on the inner face of the jaw-carrier C. Each of the bolts F also passes through a radially-extending slot $A^2$, formed in the back of the stand A, so that when the ring G is turned by the operator moving the handle $G^2$, then the bolts F travel up or down in the radial slots $A^2$ by the action of the cam-slots G' in said ring G, whereby the jaws D are likewise moved inward or outward or in or out of engagement with the work E, according to the direction in which the handle $G^2$ is turned. Now it will be seen by the arrangement described, the jaws D are simultaneously moved inward or outward, so that the work engaged by the jaws is held in the center of the rest, which center coincides with the longitudinal axis of the lathe-spindle and work center.

It is understood that the jaws D, when moved inward in engagement with the work E, are fastened in place by screwing up the nuts on the bolts F, so as to hold the said jaws securely in place to permit the work E to turn on the jaws and to hold it truly in the center of the lathe. For some work it will be necessary to open the stand A and remove the jaw-carrier D with the jaws and ring from the stand to conveniently introduce the work in the stand, it being understood that in this case the jaw-carrier, with the jaws in an outermost position, is slipped on the end of the work previous to inserting the latter in the lathe.

Having thus fully described my invention, I claim as new and desire to secure by Letters Patent—

1. In a steady-rest, the combination of a stand, the same comprising two hinged sections, a jaw-carrier removably held between said sections, a locking-ring movable concentrically within the stand, jaws radially movable in the jaw-carrier and connected with the locking-ring, and bolts respectively connected to the jaws and capable of being locked with the stand, substantially as described.

2. In a steady-rest, the combination of a stand composed of two hinged sections, a jaw-carrier removably held between said sections, jaws carried on the jaw-carrier, and a locking-ring movable concentrically in the stand and connected with the jaws, substantially as described.

3. In a steady-rest, the combination of a stand, the same being composed of two hinged sections, a jaw-carrier removably held within the stand, the jaw-carrier having a concentric recess in its face, a locking-ring concentrically movable in said recess, and jaws carried by the carrier and radially movable thereon, the jaws having connection with the locking-ring, substantially as described.

4. In a steady-rest, the combination of a stand, a jaw-carrier held thereby, the jaw-carrier having a circular and concentric recess in its face, a locking-ring movable in said recess, and jaws movable radially in the jaw-carrier and connected to the locking-ring, substantially as described.

5. In a steady-rest, the combination of a stand, the same being composed of two semicircular sections hinged to each other, the stand having a central and enlarged orifice and radial slots outward from said orifice, a jaw-carrier removably held within the stand and concentric thereto, the carrier having radial grooves, jaws respectively fitted within said grooves, bolts respectively connected to the jaws and respectively movable in the radial slots of the stand, the bolts being capable of locking in engagement with said stand, and a locking-plate concentrically movable within the stand and connected to the bolts of the jaws, substantially as described.

6. In a steady-rest, the combination of a stand, a jaw-carrier within the stand, the same being circular and concentrically related to the stand, the jaw-carrier having a circular groove in its face and radial grooves crossing said concentric groove, jaws respectively movable in the radial grooves, and a locking-plate fitting within the concentric groove and connected to the jaws, substantially as described.

7. In a steady-rest, the combination of a sectional stand, a jaw-carrier independent of the stand and held between and by the sections thereof, jaws movable on the carrier, and means for adjusting and holding the jaws, substantially as described.

JOHN H. BLUM.

Witnesses:
E. ROCHETTE,
GUSTAF J. FREIBURG.